US010935118B1

(12) United States Patent
Benson

(10) Patent No.: US 10,935,118 B1
(45) Date of Patent: Mar. 2, 2021

(54) IN-LINE TORQUE BIASING MECHANISM

(71) Applicant: Steven R. Benson, St. George, UT (US)

(72) Inventor: Steven R. Benson, St. George, UT (US)

( * ) Notice: Subject to any disclaimer, the term of this patent is extended or adjusted under 35 U.S.C. 154(b) by 0 days.

(21) Appl. No.: 16/814,515

(22) Filed: Mar. 10, 2020

(51) Int. Cl.
| | |
|---|---|
| *F16H 48/24* | (2006.01) |
| *F16H 48/38* | (2012.01) |
| *F16H 48/42* | (2012.01) |
| *F16H 57/021* | (2012.01) |
| *F16H 48/20* | (2012.01) |
| *F16H 48/36* | (2012.01) |
| *F16H 1/32* | (2006.01) |
| *F16H 57/04* | (2010.01) |

(52) U.S. Cl.
CPC ............. *F16H 48/24* (2013.01); *F16H 48/38* (2013.01); *F16H 48/42* (2013.01); *F16H 57/021* (2013.01); F16H 57/0424 (2013.01); F16H 57/0483 (2013.01); F16H 2001/327 (2013.01); F16H 2048/204 (2013.01); F16H 2048/368 (2013.01); F16H 2048/387 (2013.01); F16H 2048/426 (2013.01)

(58) Field of Classification Search
CPC .... F16H 48/10; F16H 2001/327; F16H 48/38; F16H 2048/387; F16H 48/42; F16H 2048/426; F16H 57/021; F16H 57/0424; F16H 57/0483

USPC ... 475/16, 17, 150, 160, 162, 164, 177, 204, 475/205, 225, 248, 253, 337; 74/606 R
See application file for complete search history.

(56) References Cited

U.S. PATENT DOCUMENTS

| | | | | |
|---|---|---|---|---|
| 511,290 | A * | 12/1893 | Diehl | F16H 1/32 475/169 |
| 1,354,475 | A * | 10/1920 | Elbertz | F16H 48/10 475/174 |
| 4,884,844 | A * | 12/1989 | Kershaw | B60N 2/2252 297/362 |
| 5,527,229 | A * | 6/1996 | Ishihara | F16D 43/216 475/248 |

* cited by examiner

*Primary Examiner* — Roger L Pang
(74) *Attorney, Agent, or Firm* — David R. Conklin; Kirton McConkie

(57) ABSTRACT

A differential device may include a housing having an inner surface and an outer surface, said inner surface having an outer ring gear and said outer surface having a first receptacle and a sun gear positioned within the housing, the sun gear having a second receptacle positioned opposite the first receptacle. The differential device may further include an intermediate gear interposed between the sun gear and the outer ring gear, a bearing interposed between the inner surface of the housing and the sun gear, and a central axis intersecting the first receptacle and the second receptacle. The housing and the sun gear may be configured to rotate freely about the central axis.

9 Claims, 10 Drawing Sheets

ID-LINE TORQUE BIASING MECHANISM

BACKGROUND

Different gear ratios may be desired for different vehicle applications. An off-road vehicle application may require a gear reduction to increase torque. Vehicle manufacturers design a drivetrain to optimize speed or torque for the intended vehicle performance. This design optimization varies between optimal low or high speed performances. Manufacturers generally design vehicles with an overall drivetrain (or final drive) ratio that can provide a good compromise, providing reasonable acceleration and torque (lower gearing) and also a higher speed at a practical engine speed (higher gearing). Any changes to the gear ratio to optimize performance of an existing vehicle requires rebuilding the drivetrain and installing new gears to provide the required gear reduction, which is expensive, time-consuming, and often demands a professional mechanic.

Specialized driving applications, whether high speed or high torque applications, utilizes torque biasing for greater performance. In a straight line on a flat surface, the wheels on either side of a vehicle rotate at the same speed. When turning, the left and right sides of a vehicle form two circles with varying radii. Because the outer wheels are tracking on a larger radius, they cover a greater distance in the same amount of time as the inner wheel covers the shorter distance. Further, on uneven or muddy ground, wheels having low traction spin faster than those with high traction. Because of torque vectoring, vehicles are generally equipped with differentials—mechanical devices that allow the wheels to rotate at independent speeds.

Torque vectoring technology provides the differential with the ability to vary the torque to each wheel. Differentials range from the simplistic to the complicated in their designs and implementations, but differentials form the basis for torque biasing. In doing so, a vehicle's handling characteristics may be altered to induce underdrive and overdrive, or mitigate either entirely. Current systems of torque vectoring are complex and require a monitoring system in addition to the mechanical components. For high torque situations such as rock crawling off-road vehicles, the differential also may be required to be disassembled and a new ring and pinion gears are installed to achieve a sufficiently low gear or divide the torque between each wheel. Therefore, a device that provides greater control over the vehicle performance by the owner without disassembly of the vehicle components and reduces costs to adjustments may be desired. Additionally the device should maintain an optimum gear speed ratio in spite of continuously varying load factors, be mechanically efficient, and simple to manufacture and service.

The subject matter claimed herein is not limited to embodiments that solve any disadvantages or that operate only in environments such as those described above. Rather, this background is only provided to illustrate one example technology area where some implementations described herein may be practiced.

SUMMARY

The present disclosure generally relates to in-line torque biasing mechanisms or differentials, more particularly to an in-line differential that provides infinite variable torque vectoring between predetermined high and low set points. In some embodiments, a differential device may include a housing having an inner surface and an outer surface, said inner surface may include an outer ring gear and said outer surface may include a first receptacle. In some embodiments, the differential device may further include a sun gear positioned within the housing and may include a second receptacle positioned opposite the first receptacle; an intermediate gear interposed between the sun gear and the outer ring gear; a bearing interposed between the inner surface of the housing and the sun gear; and a central axis intersecting the first receptacle and the second receptacle, where the housing and the sun gear are configured to rotate freely about the central axis.

In some embodiments, the intermediate gear may be an inner ring gear interposed between the sun gear and the outer ring gear and a shim interposed between the inner ring gear and the outer ring gear. In some embodiments, the shim may be moon-shaped. In some embodiments, the inner ring gear may include a plurality of ring gears and the shim may include a plurality of shims. In some embodiments, the plurality of inner ring gears may be separated by a washer, wherein an oil lubricant and a clearance between the washer and the inner ring gear may be configured to be a hydraulic coupling.

In some embodiments, the intermediate gear may be a set of planetary gears having a first series of gears engaged with the sun gear, and a second series of gears engaged with the outer ring gear and the first series of gears, such that the sun gear and the housing rotate about the central axis in a same direction. In some embodiments, the first series of gears and the second series of gears may be structurally identical. In some embodiments, the set of planetary gears may be seated within and between an upper bearing plate and a lower bearing plate. In some embodiments, the upper and lower bearing plates may each have a central opening through which a portion of the sun gear may extend to maintain contact between the sun gear and the set of planetary gears.

In some embodiments, the device may further include a locking mechanism configured to selectively lock the sun gear to the intermediate gear. In some embodiments, when in a locked configuration, the first receptacle and the second receptacle may rotate at a same speed. In some embodiments, the locking mechanism may be configured to be remotely activated. In some embodiments, the locking mechanism may be configured to selectively lock the sun gear to the planetary gears. In some embodiments, the locking mechanism may include a threaded bolt configured to couple the sun gear to at least one of the upper and lower bearing plates.

In some embodiments, the locking mechanism may include a first aperture in a flange of the sun gear, a second aperture in the upper bearing plate, and a threaded bolt. In some embodiments, a locked configuration of the locking mechanism is achieved when the bolt is inserted into the first and second apertures, and an unlocked configuration of the locking mechanism is achieved when the bolt is inserted only into the first aperture. In some embodiments, the threaded bolt may include a first bolt having a first length, and a second bolt having a second length that is greater than the first length. In some embodiments, the second length may be sufficient for insertion through the first and second apertures, and the first length may be sufficient only for insertion through the first aperture. In some embodiments, the bolt may include a plurality of bolts, the first aperture may include a plurality of first apertures in the flange of the sun gear, and the second aperture may include a plurality of second apertures in the upper bearing plate.

In some embodiments, the locking mechanism may include a portion of the housing and may be accessible from the outer surface and include a first aperture in a flange of the sun gear, a second aperture in the upper bearing plate, and a spring loaded pin. In some embodiments, a locked configuration of the locking mechanism may be achieved when the pin is inserted into the first and second apertures, and an unlocked configuration of the locking mechanism may be achieved when the pin is inserted into only the first aperture. In some embodiments, the pin may include a plurality of pins, the first aperture may include a plurality of first apertures in the flange of the sun gear, and the second aperture may include a plurality of second apertures in the upper bearing plate.

In some embodiments, the bearing may be a double-lipped sealed bearing. In some embodiments, the device may further include a first fastener configured to couple to a first channel in the sun gear and a second fastener configured to couple to a second channel in the housing. In some embodiments, the first and second fasteners retain the sun gear, the bearing, and the intermediate gear within the housing. In some embodiments, the first receptacle and the second receptacle are configured to couple to a rotating drive shaft. In some embodiments, an interface between the housing, the bearing, and the sun gear is fluid tight such that the housing is configured to receive an oil lubricant via a fill hole provided on the housing.

In some embodiments, the device may provide infinite variable torque vectoring between the first receptacle and the second receptacle within a predetermined mechanical high set point and a predetermined mechanical low set point. In some embodiments, the device may deliver a constant speed, an underdrive speed, or an overdrive speed between the first receptacle and the second receptacle by transferring power loads between the first receptacle and the second receptacle.

It is to be understood that both the foregoing general description and the following detailed description are examples and explanatory and are not restrictive of the invention, as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE SEVERAL VIEWS OF THE DRAWINGS

Example embodiments will be described and explained with additional specificity and detail through the use of the accompanying figures in which.

DESCRIPTION OF EMBODIMENTS

For the purpose of promoting an understanding of the principles of the invention, reference will now be made to the embodiments illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

The term "embodiment", "example", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Figure 1A:
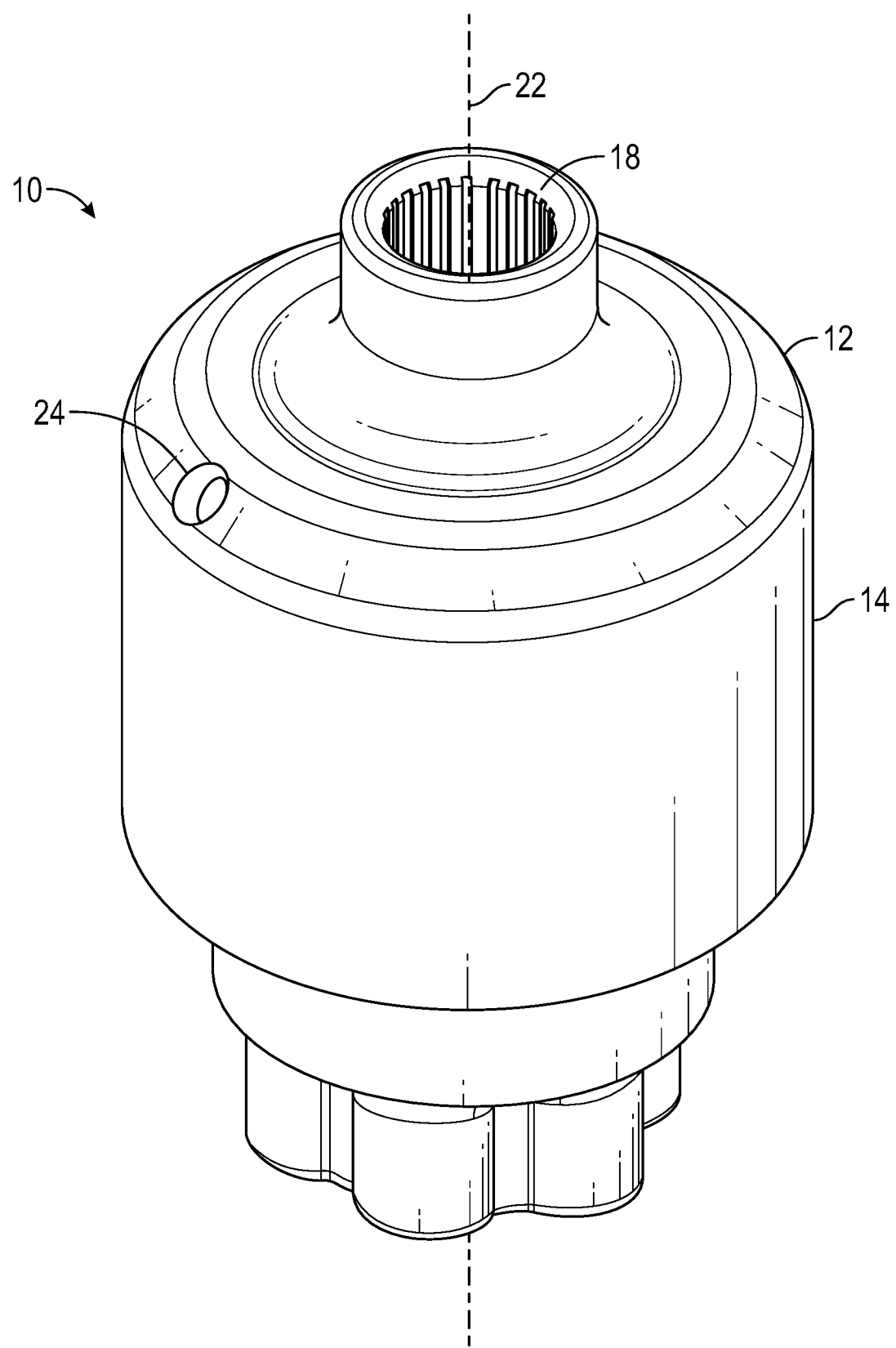
FIG. 1A is an upper perspective view of a differential device, according to some embodiments.
Figure 1B:
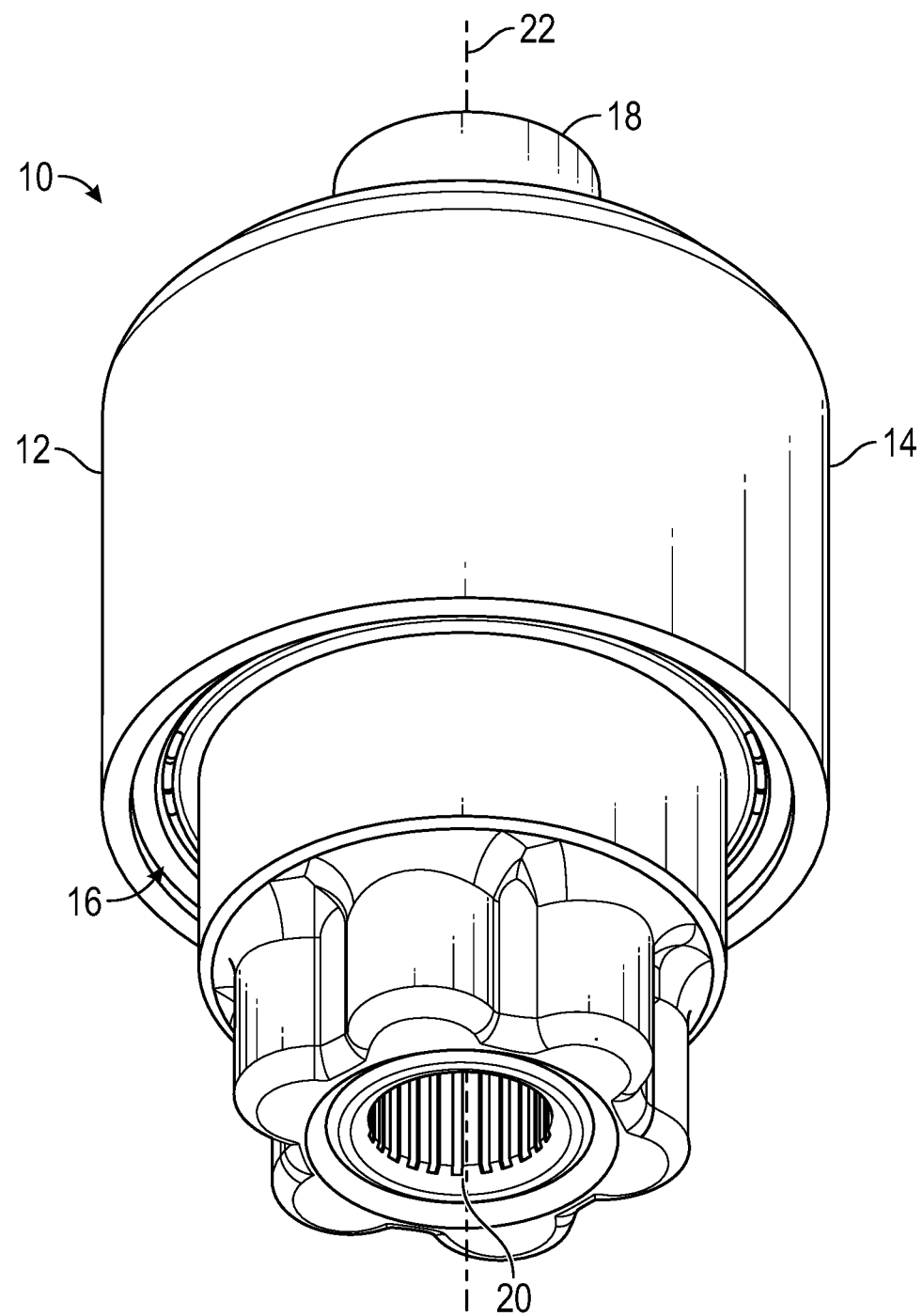
FIG. 1B is a lower perspective view of a differential device, according to some embodiments.
Figure 1C:
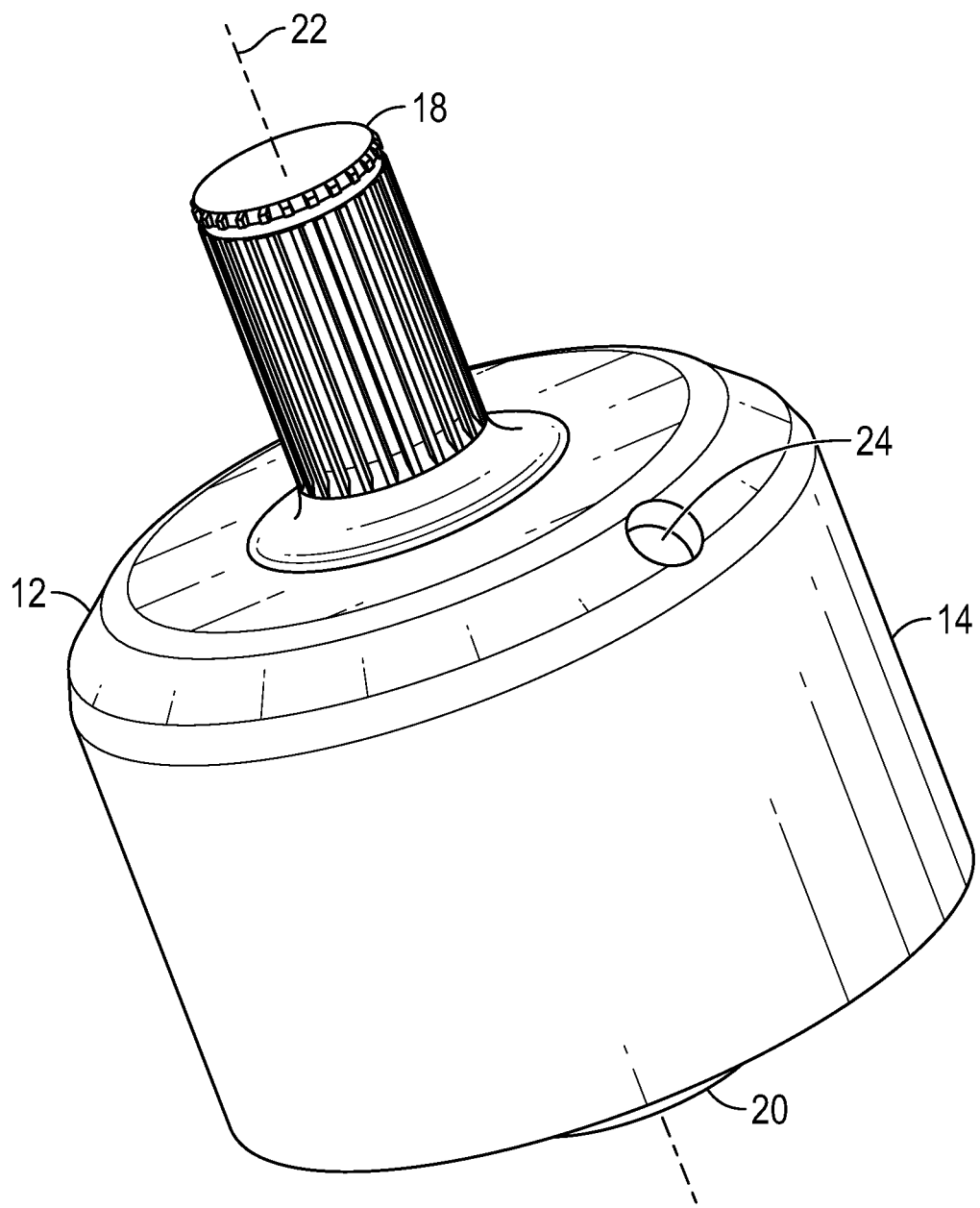
FIG. 1C is an upper perspective view of a differential device, according to some embodiments.

Referring now to FIGS. 1A-1C, in some embodiments, a differential device 10 may include a housing 12. In some embodiments, the housing 12 may include an outer surface 14 and an inner surface 16. In some embodiments, the outer surface 14 may include a first receptacle 18. In some embodiments, a second receptacle 20 may be positioned opposite the first receptacle 18. In some embodiments, the first receptacle 18 and the second receptacle 20 are configured to rotate about a central axis 22 that may intersect with the first receptacle 18 and the second receptacle 20. In some embodiments, the housing 12 may rotate freely about the central axis 22.

In some embodiments, the differential device 10 may be symmetrical about the central axis 22 to reduce vibration and minimize wear. In some embodiments, the outer surface 14 of the housing 12 may be cylindrical about the central axis 22. In some embodiments, the first receptacle 18 and/or the second receptacle 20 may be configured to couple to a rotating drive shaft (not shown). In some embodiments, the rotating drive shaft may be a vehicle drive axle, a driveshaft, a motor prop shaft, a drive mechanism, or any suitable rotating assembly. In some embodiments, the differential device 10 may balance a rotating drive shaft, stiffen the shaft, and/or dampen vibrations and shock loads. In some embodiments, the first receptacle 18 and/or the second receptacle 20 may include any suitable type of connection assembly or mechanism to couple the differential device 10 to a drive shaft including spline sockets or fasteners, flanges, and/or keyways or keyseats.

In some embodiments, the connection assembly may prevent relative rotation between the rotating drive shaft and the first receptacle 18 and/or the second receptacle 20 and may enable torque transmission between the rotating drive shaft and the first receptacle 18 and/or second receptacle 20. In some embodiments, the first receptacle 18 and/or the second receptacle 20 may be a female connector. In other embodiments, the first receptacle 18 and/or the second receptacle 20 may be a male connector, configured to insert into a female connector.

In some embodiments, the first receptacle 18 may be coupled to a rotating drive shaft or input shaft having a motor that rotates the shaft. In other embodiments, the first receptacle 18 may be coupled to a rotating drive shaft or output shaft having a load that is rotated. In some embodiments, the second receptacle 20 may be coupled to a rotating drive shaft or input shaft having a motor that rotates the shaft. In some embodiments, the second receptacle 20 may be coupled to a rotating drive shaft or output shaft having a load that is rotated. In some embodiments, in a dynamic application, an input shaft may convert to an output shaft and vice versa.

In some embodiments, the housing 12 may include a fill hole 24 on the outer surface 14. In some embodiments, the housing 12 may be configured to receive an oil lubricant via the fill hole 24. In some embodiments, the housing 12 may be filled with the oil lubricant, the oil lubricant may be changed, and the oil lubricant may be drained via the fill hole 24. In some embodiments, the housing 12 may be rotated to add, remove, or change the oil lubricant.

Figure 2A:
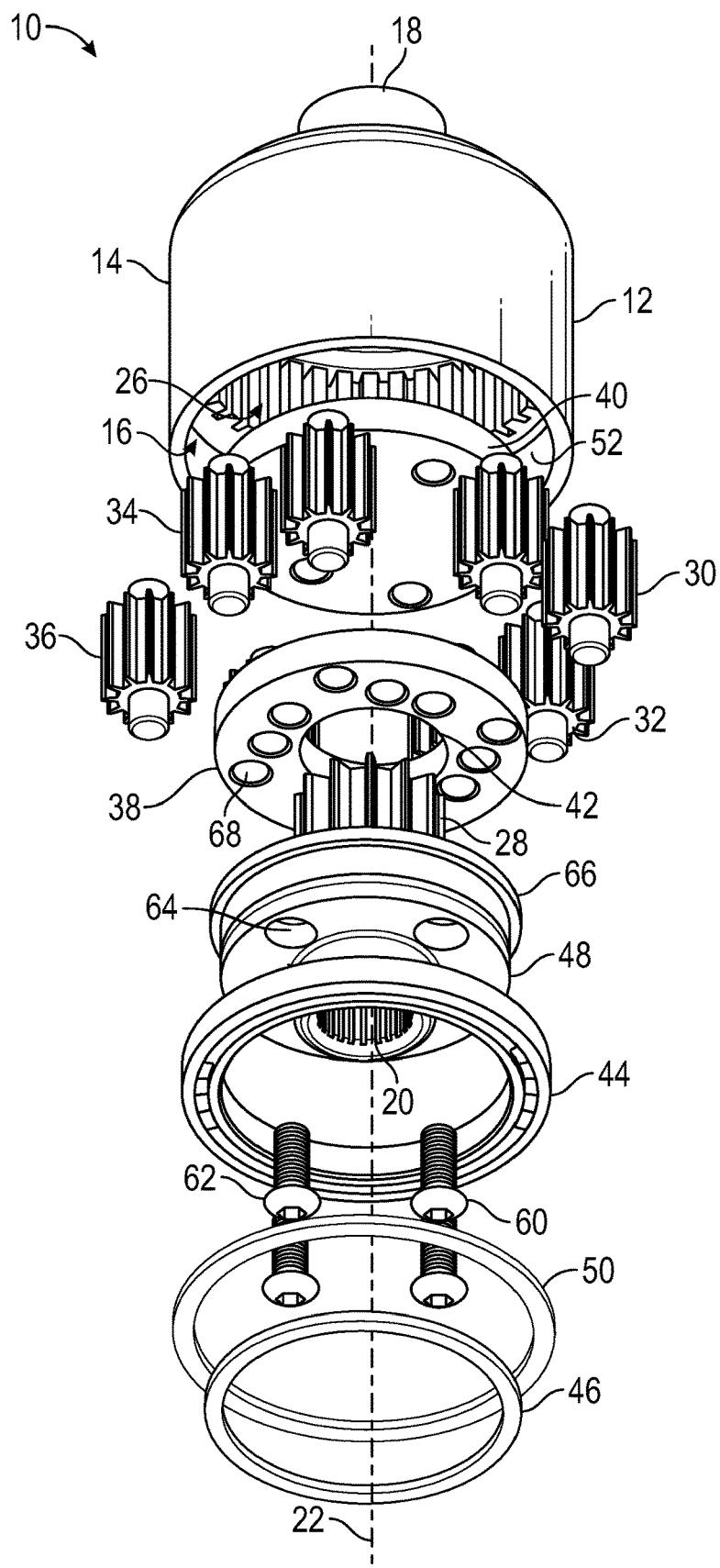
FIG. 2A is an expanded view of a differential device, according to some embodiments.
Figure 2B:
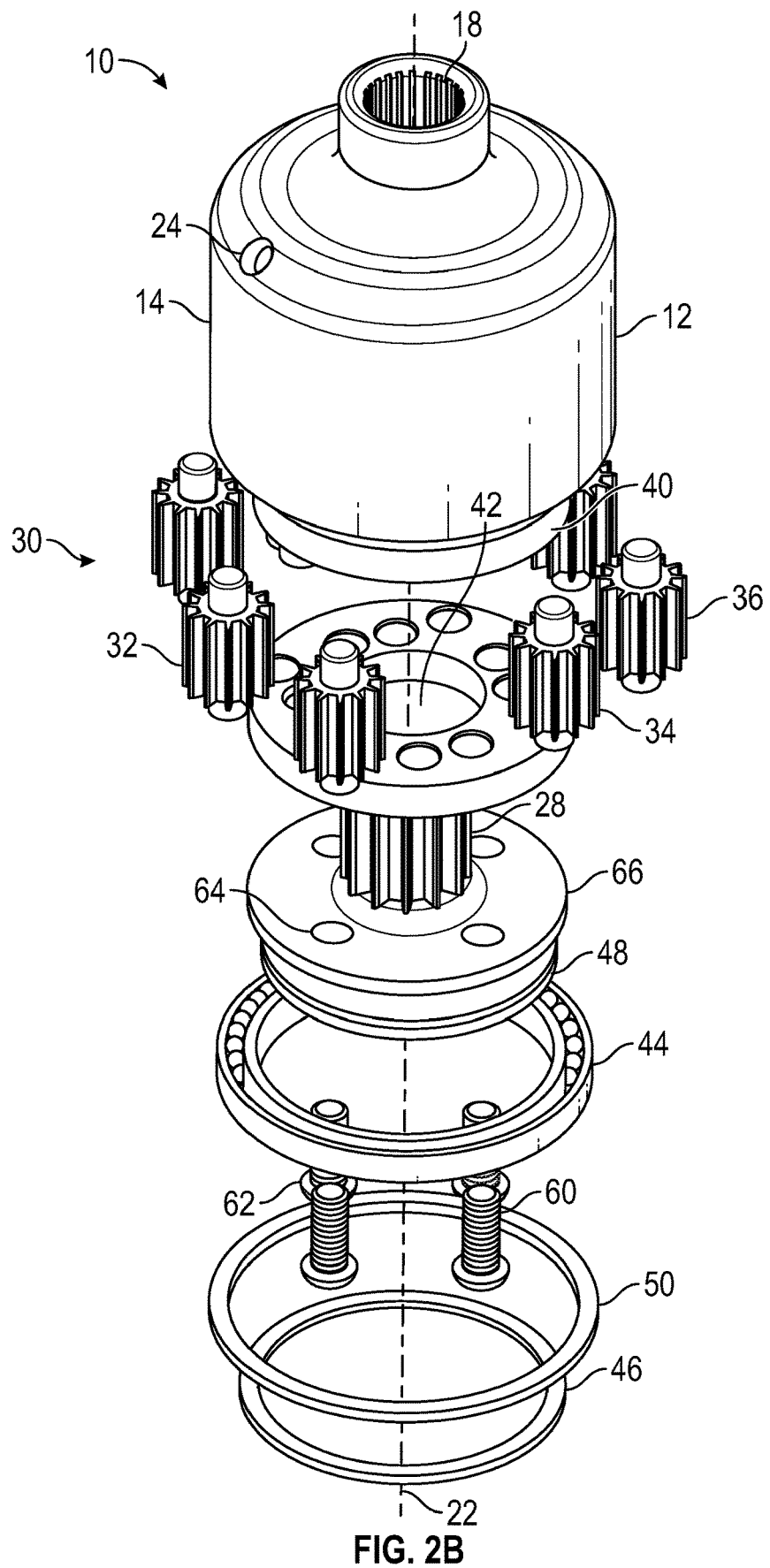
FIG. 2B is another expanded view of a differential device, according to some embodiments.

Referring now to FIGS. 2A-2B, in some embodiments, the differential device 10 may include an outer ring gear 26 on the inner surface 16 of the housing 12. In some embodiments, the outer ring gear 26 may be coupled to the inner surface 16 by any suitable means. In some embodiments, the outer ring gear 26 may be coupled to the first receptacle 18. In some embodiments, the outer ring gear 26 may be monolithically formed as a single unit with the inner surface 16 and the first receptacle 18.

In some embodiments, the differential device 10 may include a sun gear 28 positioned within the housing 12. In some embodiments, the sun gear 28 may be coupled to the second receptacle 20. In some embodiments, the sun gear 28 may be monolithically formed as a single unit with the second receptacle 20.

In some embodiments, the differential device 10 may include an intermediate gear 30 interposed between the outer ring gear 26 and the sun gear 28. In some embodiments, as power is applied to an input shaft and it rotates, the second receptacle 20 and the sun gear 28 also rotate. In some embodiments, because the sun gear is coupled to the intermediate gear 30, the intermediate gear rotates, which in turn rotates the outer ring gear 26. In some embodiments, outer ring gear 26 is coupled to the housing 12, the housing 12 also rotates in the same direction as the input shaft.

In some embodiments, the intermediate gear 30 may include a set of planetary gears 32 having a first series of gears 34 engaged with the sun gear 28, and a second series of gears 36 engaged with the outer ring gear 26 and the first series of gears 34. In some embodiments, the first series of gears 34 and the second series of gears 36 are engaged with the sun gear 28 and the outer ring gear 26 such that the sun gear 28 and the housing 12 rotate about the central axis 22 in the same direction.

In some embodiments, the first series of gears 34 and the second series of gears 36 may be structurally identical. In some embodiments, the first series of gears 34 and the second series of gears 36 may have the same size and number of teeth. In some embodiments, the first series of gears 34 and the second series of gears 36 may be different sizes and/or include any suitable features to produce higher or lower gear ratios or other gear reducing effects.

In some embodiments, the set of planetary gears 32 may be seated within and/or between an upper bearing plate 38 and a lower bearing plate 40. In some embodiments, a portion of the planetary gear 32 may extend into an aperture in the upper bearing plate 38 and lower bearing plate 40. In some embodiments, the upper 38 and lower 40 bearing plates may each have a central opening 42 through which a portion of the sun gear 28 may extend so that the sun gear 28 may be configured to contact the set of planetary gears 32. In some embodiments, the first series of gears 34 may include at least one gear. In some embodiments, the second series of gears 36 may also include at least one gear. In other embodiments, the first series of gears 34 and the second series of gears 36 have the same number of gears. In some embodiments, the first series of gears 34 and the second series of gears 36 have four gears, however any suitable number of gears in each series may be utilized. In some embodiments, the number and type of planetary gears may be adjusted to achieve a preferred balance, gear ratio, or durability of the differential device 10.

In some embodiments, the differential device 10 may include a bearing 44. In some embodiments, the bearing 44 may be interposed between the inner surface 16 of the housing 12 and the sun gear 28. In some embodiments, the bearing 44 may have one or more seals. In some embodiments, the bearing may be a double-lipped sealed bearing. In some embodiments, the double-lipped seal may protect the bearings from water or other corrosion-causing oxidizers. In other embodiments, the bearing 44 may be a thrust bearing. In some embodiments, the bearing 44 provides a smooth rotation of the sun gear 28 relative to the housing 12 and also may be a seal to maintain lubricant within the housing 12. In some embodiments, the bearing 44 may not have a seal, and a separate seal (not illustrated) may be included to seal the housing 12. In some embodiments, the sun gear 28 may be held longitudinally stationary within the housing 12 by the bearing 44 because the bearing abuts the sun gear 28.

In some embodiments, the differential device 10 may include a first fastener 46 that may be configured to couple to a first channel 48 in the sun gear 28 and a second fastener 50 that may be configured to couple to a second channel 52 in the housing 12. In some embodiments, the first and second fasteners 46, 50 may retain the sun gear 28, the bearing 44, and the intermediate gear 30 within the housing 12. In some embodiments, the first and second fasteners 46, 50 may be compression washers, sealing washers, bonded washers, threaded fittings, or any other suitable fasteners.

Figure 3A:
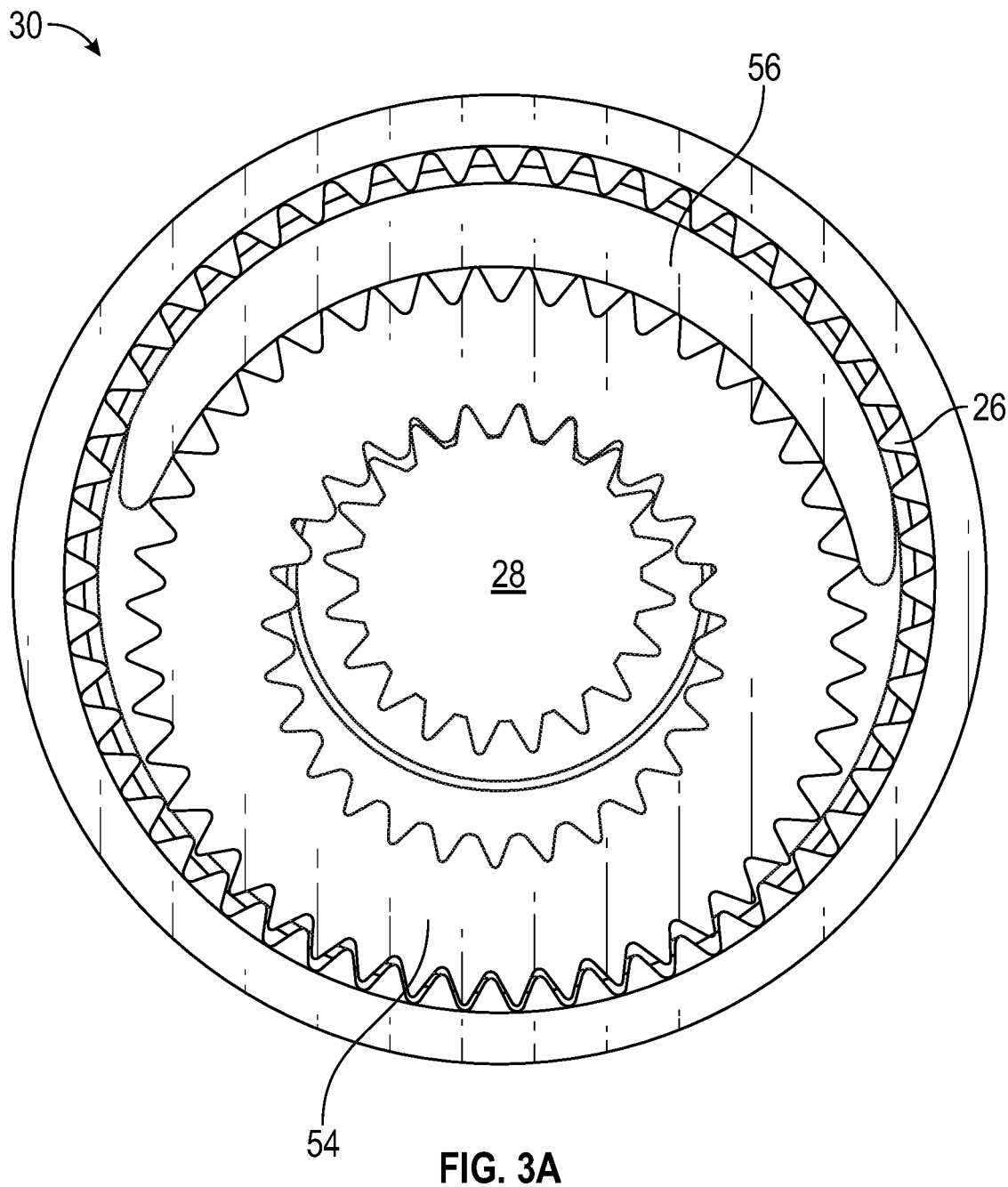
FIG. 3A is a front view of an intermediate gear having an inner ring gear and a shim, according to some embodiments.
Figure 3B:
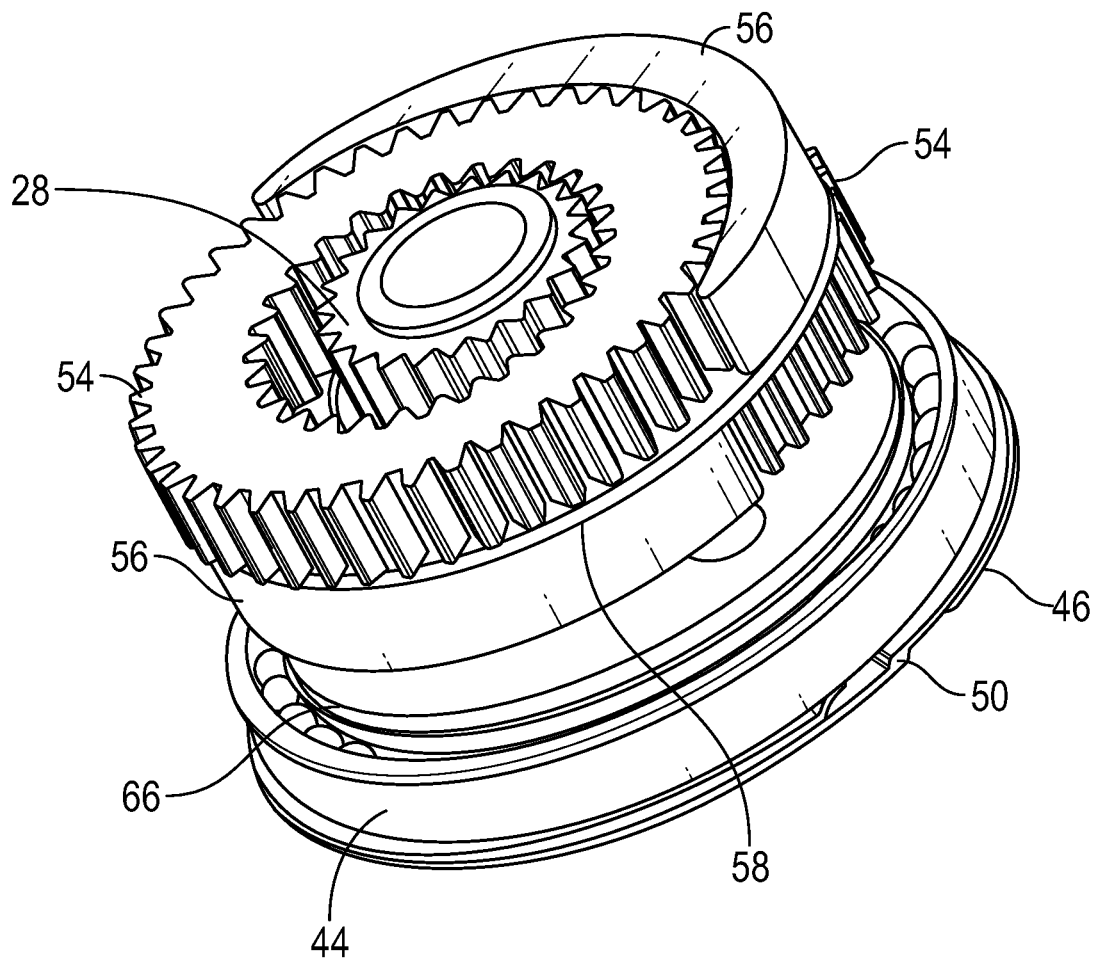
FIG. 3B is an upper perspective view of an intermediate gear having an inner ring gear and a shim, according to some embodiments.

Referring now to FIGS. 3A-3B, in some embodiments, the intermediate gear 30 may be an inner ring gear 54. In some embodiments, the inner ring gear 54 may be interposed between the sun gear 28 and the outer ring gear 26. In some embodiments, the inner ring gear 54 may include teeth on both an outer surface and an inner surface of the inner ring gear 54. In some embodiments, to engage the inner ring gear 54 to both the sun gear 28 and the outer ring gear 26, the intermediate gear 30 may include a shim 56 interposed between the inner ring gear 54 and the outer ring gear 26. In some embodiments, the shim 56 is moon-shaped.

In some embodiments, because the inner surface of the inner ring gear 54 may be engaged to the sun gear 28 and the outer surface of the inner ring gear 54 may be engaged to the outer ring gear 26, the sun gear 28 and the housing 12, which is coupled to the outer ring gear 26, may rotate about the central axis 22 in the same direction. In some embodiments, the inner radius and/or the outer radius of the inner ring gear

54 may be any suitable radius to obtain a desired gear ratio of the differential device 10. Further, in some embodiments, the circumference of the sun gear 28 and/or the outer ring gear 26 may be any suitable radius to obtain a desired gear ratio of the differential device 10.

In some embodiments, the shim 56 may rotate about the central axis 22 while interposed between the inner ring gear 54 and the outer ring gear 26. In some embodiments, the shim 56 may be in contact with a portion of the outer ring gear 26 and a portion of the inner ring gear 54 continuously. In some embodiments, the shim 56 may be moon-shaped to reduce friction between the shim 56 and the teeth of the inner ring gear 54 and the outer ring gear 26. In some embodiments, the shim 56 and/or the sun gear 28, the intermediate gear 30, and the outer ring gear 26 may be constructed of a durable metal such as high-strength or hardened steel or any suitable alloy.

In some embodiments, the shim 56 may be configured to form an oil wedge. In some embodiments, the interaction of the inner ring gear 54, the outer ring gear 26, and the shim 56 relies on the principle of hydrodynamic lubrication. In some embodiments, when the shim 56 and the gear surfaces are in contact or slide over each other, the contact between the surfaces may cause a friction and consequently the production of heat. During the motion of the sliding surfaces, frictional heat may be high at the contact surface. In some embodiments, this may result in a high local temperature even under relatively light loads and speeds. In some embodiments, the friction may also cause wear of the surfaces of the moving parts. In some embodiments, hydrodynamic lubrication is the formation of an oil wedge. In some embodiments, when the shim 56 rotates, it creates an oil taper or wedge between the two surfaces, and the pressure build up from an oil film supports the shim 56 to minimize contact between the shim 56 and the teeth of the outer ring gear 26, the sun gear 28, and the intermediate gear 30.

In some embodiments, the outer ring gear 26, the sun gear 28, and the intermediate gear 30 may include any contact pattern that makes the differential device 10 exhibit desired behaviors with regard to noise, durability, and/or efficiency. In some embodiments, due to the cylindrical shape of the housing 12, the sun gear 28, and the intermediate gear 30 the differential device 10 may be dynamically balanced about the central axis 22.

In some embodiments, the inner ring gear 54 may include a plurality of inner ring gears 54 and the shim 56 may include a plurality of shims 56. In some embodiments, the plurality of inner ring gears 54 may be separated from each other and from other components by a washer 58. In some embodiments, the washer 58 may be coupled to the inner ring gear 54. In other embodiments, the washer 58 may freely rotate. In some embodiments, the plurality of inner ring gears 54 may be arranged such that the inner ring gears 54, the washers 58, and the plurality of shims 56 may be dynamically balanced about the central axis 22.

In some embodiments, an oil lubricant and a clearance between the washer 58 and the inner ring gear 54 may be configured to be a hydraulic coupling. In some embodiments, the hydraulic coupling may transmit rotating mechanical power during variable speed operation. In some embodiments, the hydraulic coupling may transmit power from the input shaft to the output shaft or from the output shaft to the input shaft by means of acceleration and deceleration of the oil lubricant. The hydraulic coupling relies on hydrokinetic principles and requires a difference in rotation speed or slip between the input shaft and the output shaft.

In some embodiments, the viscosity of the oil lubricant may influence gear ratios for a given rotational acceleration, deceleration, or speed. In some embodiments, as the rotational speed of the input shaft increases the sun gear 28 may rotate and the rotation motion may impart both an outward linear and rotational motion to the oil lubricant. The sun gear 28 may then cause the inner ring gears 54 to rotate that may be configured to pump the oil lubricant throughout the housing.

In some embodiments, as rotational and linear forces act upon the oil lubricant, the pressure upon the oil lubricant may increase between the gear teeth and cause the oil lubricant pressure to increase within the clearances between the washer 58 and the inner ring gear 54. The oil lubricant within the clearances may be pumped by the gear interactions to form a substantially toroidal flow passage through the clearances between the washer 58 and the inner ring gear 54 that may act to convert the mechanical energy of the gears to hydrokinetic energy and then back to mechanical energy. In some embodiments, the hydrokinetic energy of the oil lubricant flowing through the clearances may produce a gradual increase in torque and may cause the gear ratio to decrease more rapidly until the gear ratio is 1:1. Thus the gear ratio may be dynamic until the first receptacle 18 and the second receptacle 20 rotate at the same speed.

In some embodiments, a greater viscosity of oil lubricant and/or relatively reduced clearances may cause the gear reduction to be minimized or the torque to increase because the friction of the oil lubricant between the washer 58 and the inner ring gears 54 increases. In some embodiments, a lower viscosity of oil lubricant and/or greater clearances may cause the gear reduction to be maximized or the torque to decrease because the friction of the oil lubricant between the washer 58 and the inner ring gears 54 decreases. In some embodiments, increasing viscosity of the oil lubricant may increase the amount of torque transmitted for a given input speed.

Figure 4A:
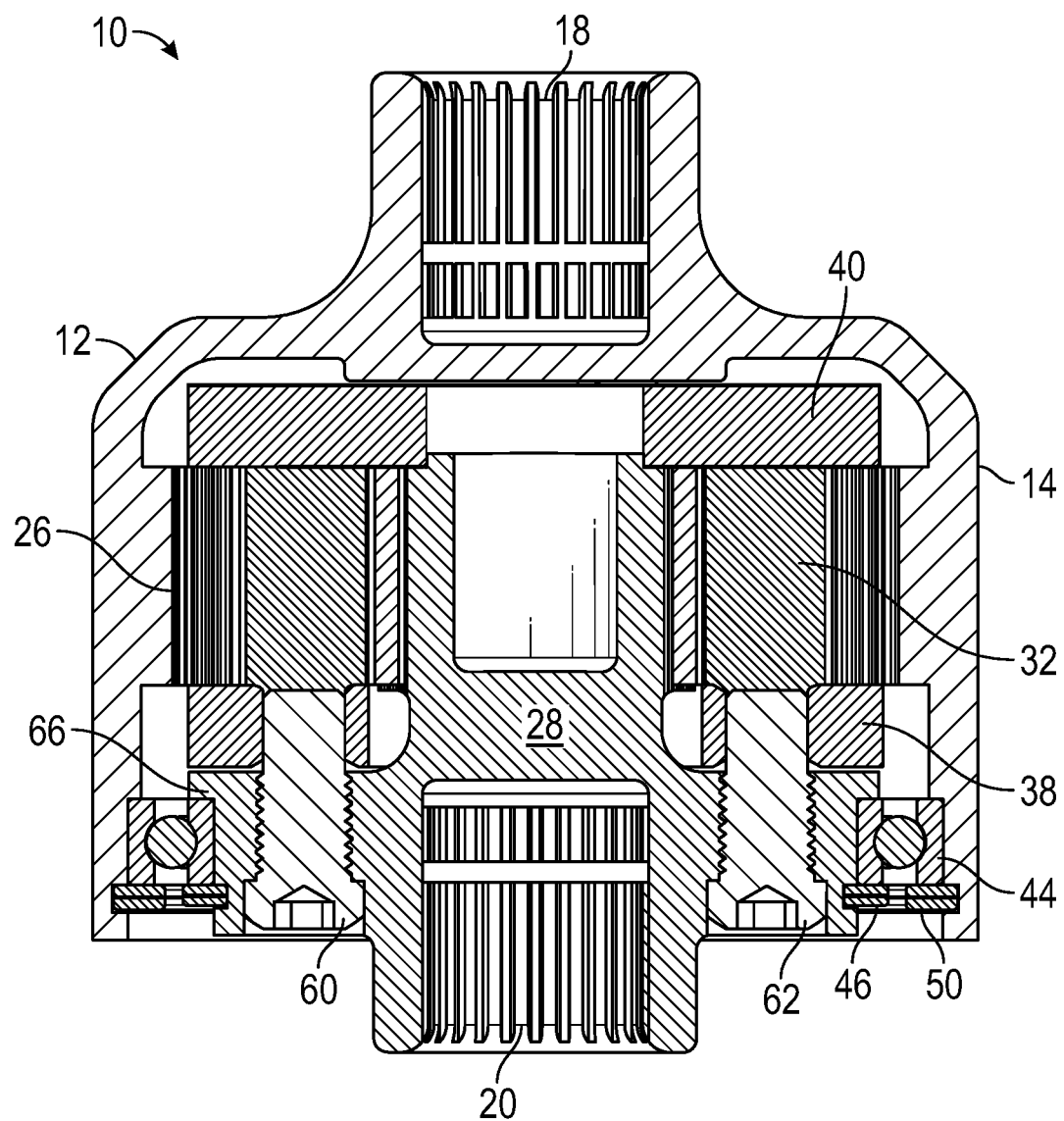
FIG. 4A is a cross-sectional view of a differential device, according to some embodiments.
Figure 4B:
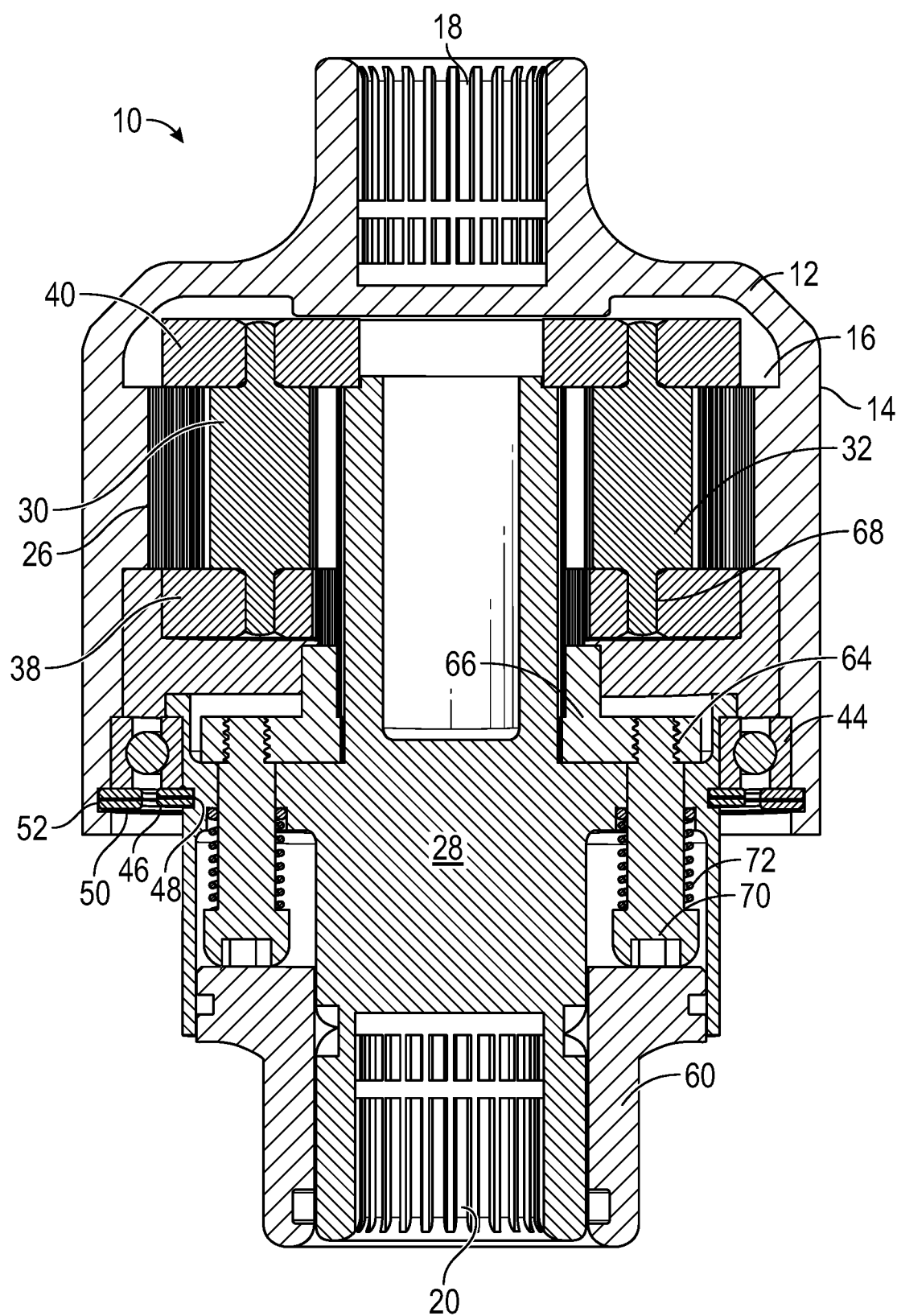
FIG. 4B is a cross-sectional view of a differential device, according to some embodiments.

Referring now to FIGS. 4A-4B, in some embodiments, the differential device 10 may include a locking mechanism 60. In some embodiments, the locking mechanism 60 may be configured to selectively lock the sun gear 28 to the intermediate gear 30. In some embodiments, when the differential device 10 is in a locked configuration, the first receptacle 18 and the second receptacle 20 rotate at a same speed. In some embodiments, when the differential device 10 is in a locked configuration, the gear ratio of the first receptacle 18 and the second receptacle 20 is 1:1.

In some embodiments, the locking mechanism 60 may be configured to be locally activated. In some embodiments, the locking mechanism 60 may be activated from the outer surface 14 of the differential device 10. In some embodiments, the locking mechanism 60 may be remotely activated. In some embodiments, the locking mechanism 60 may be remotely activated via a mechanical clutch or an electric signal, electromagnets, power key switch, or other suitable circuit implantation.

In some embodiments, the locking mechanism 60 may be configured to selectively lock the sun gear 28 to the planetary gears 32. In some embodiments, the locking mechanism 60 may include a threaded bolt 62 configured to couple the sun gear 28 to at least one of the upper and lower bearing plates 38, 40. In some embodiments, the locking mechanism 60 may include a first aperture 64 in a flange 66 of the sun gear, a second aperture 68 in the upper bearing plate, and the threaded bolt 62. In some embodiments, a locked configuration of the locking mechanism 60 may be achieved when the bolt 62 may be inserted into the first 64 and second 68 apertures, and an unlocked configuration of the locking mechanism 60 may be achieved when the bolt 62 may be inserted only into the first aperture 64.

In some embodiments, the threaded bolt 62 may include a first bolt having a first length, and a second bolt having a second length that may be greater than the first length, wherein the second length may be sufficient for insertion through the first 64 and second 68 apertures, and the first length may be sufficient only for insertion through the first aperture 64. In some embodiments, the bolt 62 may include a plurality of bolts 62, the first aperture 64 may include a plurality of first apertures 64 in the flange 66 of the sun gear 28, and the second aperture 68 may include a plurality of second apertures 68 in the upper bearing plate 38. Thus, in some embodiments, the plurality of shorter bolts or bolts of the first length, may be removed and replaced by the plurality of longer bolts or bolts of the second length to place the differential device 10 into the locked configuration.

In some embodiments, the locking mechanism 60 may include a portion of the housing 12 and may be accessible from the outer surface 14 and may include a first aperture 64 in a flange 66 of the sun gear 28, a second aperture 68 in the upper bearing plate 38, and a spring loaded pin 70. In some embodiments, the locking mechanism 60 may include a central opening through which the second receptacle 20 extends. In some embodiments, the locking mechanism 60 may be placed in a locked configuration by pushing the portion of the housing 12 having the locking mechanism 60 therein into the housing 12.

In some embodiments, the locking mechanism 60 may include a retaining means that retains the locking mechanism 60 in a locked configuration. In some embodiments, the retaining means may include a retaining pin. In some embodiments, the retaining means may include turning the locking mechanism 60 to engage a catch, or any other suitable retaining means. In some embodiments, the locking mechanism 60 may be retained in an unlocked configuration via a pin spring 72. In some embodiments, the pin spring 72 may be configured around the pin 70.

In some embodiments, a locked configuration of the locking mechanism 60 may be achieved when the pin 70 may be inserted into the first 64 and second 68 apertures, and an unlocked configuration of the locking mechanism 60 may be achieved when the pin 70 may be inserted into only the first aperture 64. In some embodiments, the pin 70 may include a plurality of pins 70, the first aperture 64 may include a plurality of first apertures 64 in the flange 66 of the sun gear 28, and the second aperture 68 may include a plurality of second apertures 68 in the upper bearing plate 38.

Figure 4C:
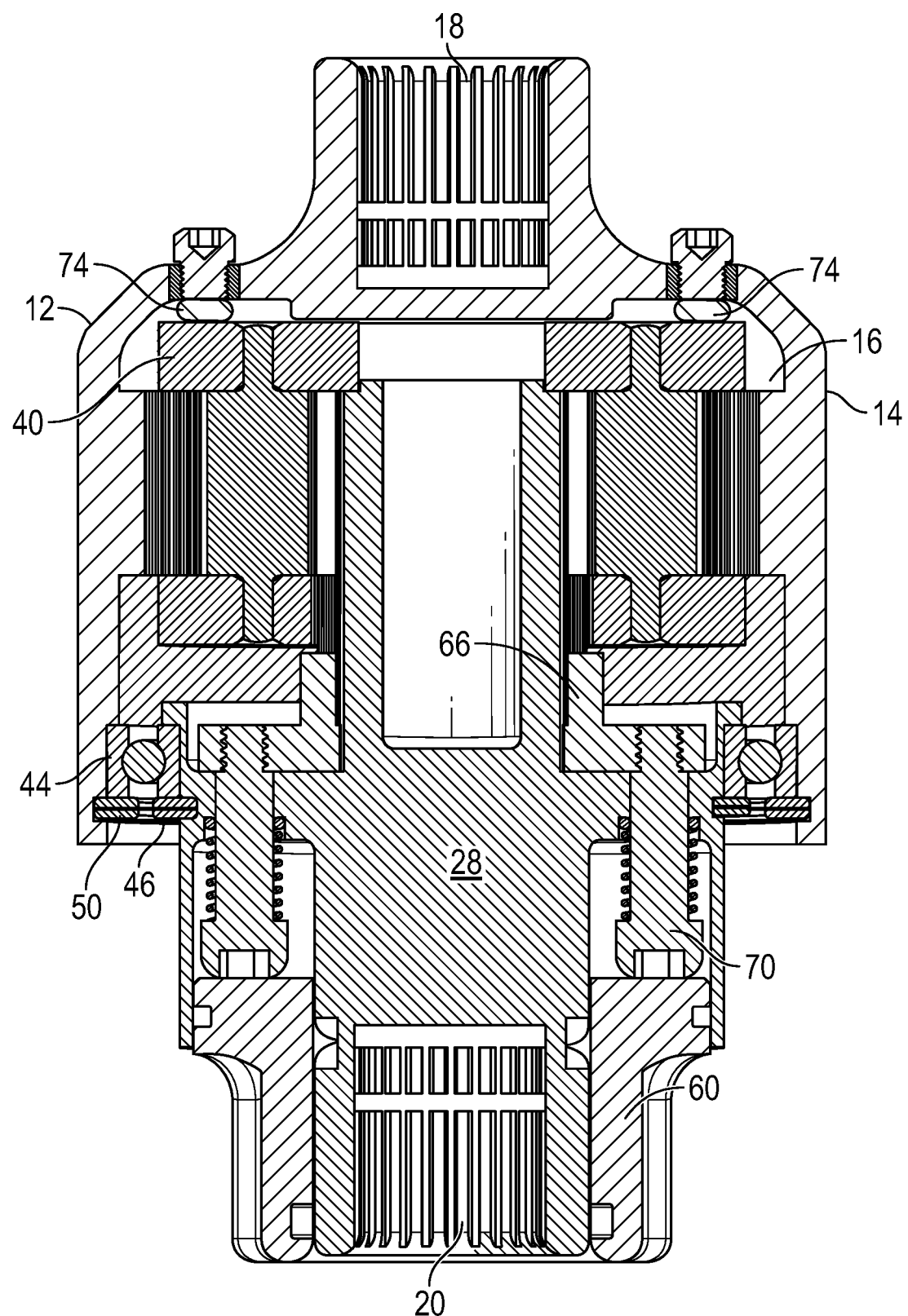
FIG. 4C is a cross-sectional view of a differential device, according to some embodiments.

Referring now to FIG. 4C, in some embodiments, the locking mechanism 60 may be a friction lock 74. In some embodiments, the friction lock 74 may include one or more Belleville washers or disc springs. In some embodiments, the disc spring may apply a more flexible friction-based lock to the flange 66 of the sun gear 28 or to the intermediate gear 30. In some embodiments, the friction lock 74 may contact the inner ring gear 54. In some embodiments, multiple disc springs may be stacked to increase the spring constant and the amount of friction. In some embodiments, the locking mechanism 60 may be configured to selectively lock the sun gear 28 to the intermediate gear 30, wherein when in a locked configuration, the first receptacle 18 and the second receptacle 20 rotate at a same speed. In some embodiments, the friction lock 74 may be variable, such that the first receptacle 18 and the second receptacle 20 rotate a variable speeds according to the load and/or the amount of friction applied to the friction lock 74. In some embodiments, the friction lock 74 may be configured to be activated or adjusted remotely or locally. In some embodiments, the friction lock 74 may be adjusted via bolts extending through the housing 12 in any suitable location. In some embodiments, one end of the bolts may contact the friction lock 74 to adjust the amount of friction directly.

In some embodiments, the friction lock 74 may be between the bearing 44 and the flange 66 of the sun gear 28. In some embodiments, the friction lock 74 may be between the flange 66 and the inner ring gear 54. In some embodiments, the friction lock 74 may be between the housing 12 and the flange 66. Other embodiments may include the friction lock between the housing 12 and the intermediate gear 30 or any other suitable location. In some embodiments that utilize a friction lock 74, the bearing 44 may be a thrust bearing.

In some embodiments, the differential device 10 may provide a gear ratio between the first receptacle 18 and the second receptacle 20 to infinitely vary according to the rotational speed of the input shaft and the load on the output shaft. As an example, in some embodiments, the differential device 10 may provide a 3:1 gear reduction when the differential device 10 is in an unlocked configuration and a 1:1 gear ratio when the differential device 10 is in a locked configuration. In some embodiments, the differential device may provide an automatic selection of gear ratios within a predetermined mechanical high set point and a predetermined mechanical low set point, based upon an input power, an output load, and any internal resistance. In some embodiments, the mechanical set points may be set by the size of the gears, the number of differential devices 10 installed, and/or the input power. In some embodiments, the differential device 10 delivers infinite torque vectoring between the mechanical high set points and mechanical low set points.

In some embodiments, a differential device 10 may be installed on both a front and rear axle of a four-wheel drive vehicle. When installed on both axles, the differential device 10 may provide torque biasing between the front axle and the rear axle. In some embodiments, the differential device 10 may be installed on a vehicle drive shaft to enable a gear reduction for high torque applications such as rock crawling in an unlocked configuration and remove the gear reduction by having the differential device 10 in a locked configuration for high speed applications. Thus, vehicles having the differential device 10 installed on the drive shaft may achieve low gear without disassembly or rebuilding of the main gear box or maid differential of the vehicle.

In some embodiments, the differential device 10 provides the input power to the output loads with an infinite speed range. In some embodiments, an optimum speed ratio between the input shaft and the output shaft may be maintained in spite of continuously varying load factors. In some embodiments, the differential device 10 may deliver a constant speed, an underdrive speed, or an overdrive speed between the first receptacle 18 and the second receptacle 20 by transferring power loads between the first receptacle and the second receptacle.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

I claim:

1. A differential device, comprising:
 a housing having an inner surface and an outer surface, said inner surface comprising an outer ring gear and said outer surface comprising a first receptacle;
 a sun gear positioned within the housing and comprising a second receptacle positioned opposite the first receptacle;
 an inner ring gear interposed between the sun gear and the outer ring gear;
 a moon-shaped shim interposed between the inner ring gear and the outer ring gear;
 a bearing interposed between the inner surface of the housing and the sun gear; and
 a central axis intersecting the first receptacle and the second receptacle, wherein the housing and the sun gear are configured to rotate freely about the central axis.

2. The device of claim 1, wherein the inner ring gear comprises a plurality of inner ring gears and the shim comprises a plurality of shims.

3. The device of claim 2, wherein the plurality of inner ring gears are separated by a washer, wherein an oil lubricant and a clearance between the washer and the inner ring gear are configured to be a hydraulic coupling.

4. The device of claim 1, wherein the bearing is a double-lipped sealed bearing.

5. The device of claim 1, further comprising a first fastener configured to couple to a first channel in the sun gear and a second fastener configured to couple to a second channel in the housing, wherein the first and second fasteners retain the sun gear, the bearing, and the inner ring gear within the housing.

6. The device of claim 1, wherein the first receptacle is configured to couple to a first rotating drive shaft, and the second receptacle is configured to couple to a second rotating drive shaft.

7. The device of claim 1, wherein an interface between the housing, the bearing, and the sun gear is fluid tight such that the housing is configured to receive an oil lubricant via a fill hole provided on the housing.

8. The device of claim 1, wherein the device provides variable torque vectoring between the first receptacle and the second receptacle within a predetermined mechanical high set point and a predetermined mechanical low set point.

9. The device of claim 1, wherein the device delivers a constant speed, an underdrive speed, or an overdrive speed between the first receptacle and the second receptacle by transferring power loads between the first receptacle and the second receptacle.

* * * * *